United States Patent
Oosako (10) Patent No.: US 7,912,563 B2
(45) Date of Patent: Mar. 22, 2011

(54) SAFETY CONTROL SYSTEM

(75) Inventor: Satoru Oosako, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 305 days.

(21) Appl. No.: 12/220,006

(22) Filed: Jul. 21, 2008

(65) Prior Publication Data

US 2009/0228116 A1 Sep. 10, 2009

(30) Foreign Application Priority Data

Jul. 19, 2007 (JP) ................................. 2007-188462

(51) Int. Cl.
  G05B 9/02 (2006.01)
  G05B 11/01 (2006.01)
  G06F 11/30 (2006.01)
  G21C 17/00 (2006.01)
  G08B 21/00 (2006.01)
  G08B 13/00 (2006.01)

(52) U.S. Cl. .............. 700/79; 700/21; 700/80; 702/114; 702/118; 702/184; 340/540; 340/541

(58) Field of Classification Search .................... 700/21, 700/79–80; 340/540–541; 702/114, 118, 702/184

See application file for complete search history.

(56) References Cited

U.S. PATENT DOCUMENTS

| | | | | |
|---|---|---|---|---|
| 5,825,664 A | * | 10/1998 | Warrior et al. .................... 700/7 |
| 6,243,657 B1 | * | 6/2001 | Tuck et al. .................... 702/150 |
| 6,298,454 B1 | * | 10/2001 | Schleiss et al. ................ 714/37 |
| 6,370,127 B1 | * | 4/2002 | Daraiseh et al. .............. 370/328 |
| 6,370,448 B1 | * | 4/2002 | Eryurek ........................ 700/282 |
| 6,532,392 B1 | * | 3/2003 | Eryurek et al. ................. 700/54 |
| 6,862,547 B2 | * | 3/2005 | Snowbarger et al. ......... 702/114 |
| 7,385,796 B2 | * | 6/2008 | Flanders ....................... 361/104 |
| 2002/0126620 A1 | * | 9/2002 | Heckel et al. ................. 370/216 |
| 2004/0260408 A1 | * | 12/2004 | Scott et al. ...................... 700/20 |
| 2006/0271833 A1 | * | 11/2006 | Teranishi et al. ............. 714/799 |
| 2007/0142934 A1 | * | 6/2007 | Boercsoek et al. ............. 700/23 |
| 2009/0171479 A1 | * | 7/2009 | Oosako ........................... 700/79 |

FOREIGN PATENT DOCUMENTS

| | | |
|---|---|---|
| DE | 102006053866 A1 | 5/2008 |
| GB | 2 423 835 A | 9/2006 |
| JP | 2006-164143 | 6/2006 |
| WO | WO-2007051595 | 5/2007 |

* cited by examiner

Primary Examiner — Ramesh B Patel (74) Attorney, Agent, or Firm — Westerman, Hattori, Daniels & Adrian, LLP (57) ABSTRACT

A safety control system includes a plurality of safety control stations connected to a control bus to communicate with each other and with a distributed control system including a plurality of control stations connected to the control bus, wherein each of the plurality of safety control stations has an interface through which each of the plurality of safety control stations is connected to the control bus for transmitting own data of each of the plurality of safety control stations to all other safety control stations by broadcasting at a fixed cycle via the control bus and for receiving by each safety control station transmitted data from all other safety control stations, and wherein the interface implements a safety layer used to generate and diagnose safety information.

10 Claims, 11 Drawing Sheets

TRANSMITTED DATA FROM SCS

FIG. 7B

TRANSMITTED DATA FROM FCS

SAFETY CONTROL SYSTEM

This application claims priority to Japanese Patent Application No. 2007-188462, filed Jul. 19, 2007, in the Japanese Patent Office. The Japanese Patent Application No. 2007-188462 is incorporated by reference in its entirety.

TECHNICAL FIELD

The present disclosure relates to safety assurance of communication between safety control stations provided in a safety control system that is integrated with a distributed control system, and connected to a control bus that is used commonly in both systems.

RELATED ART

Figure 8:
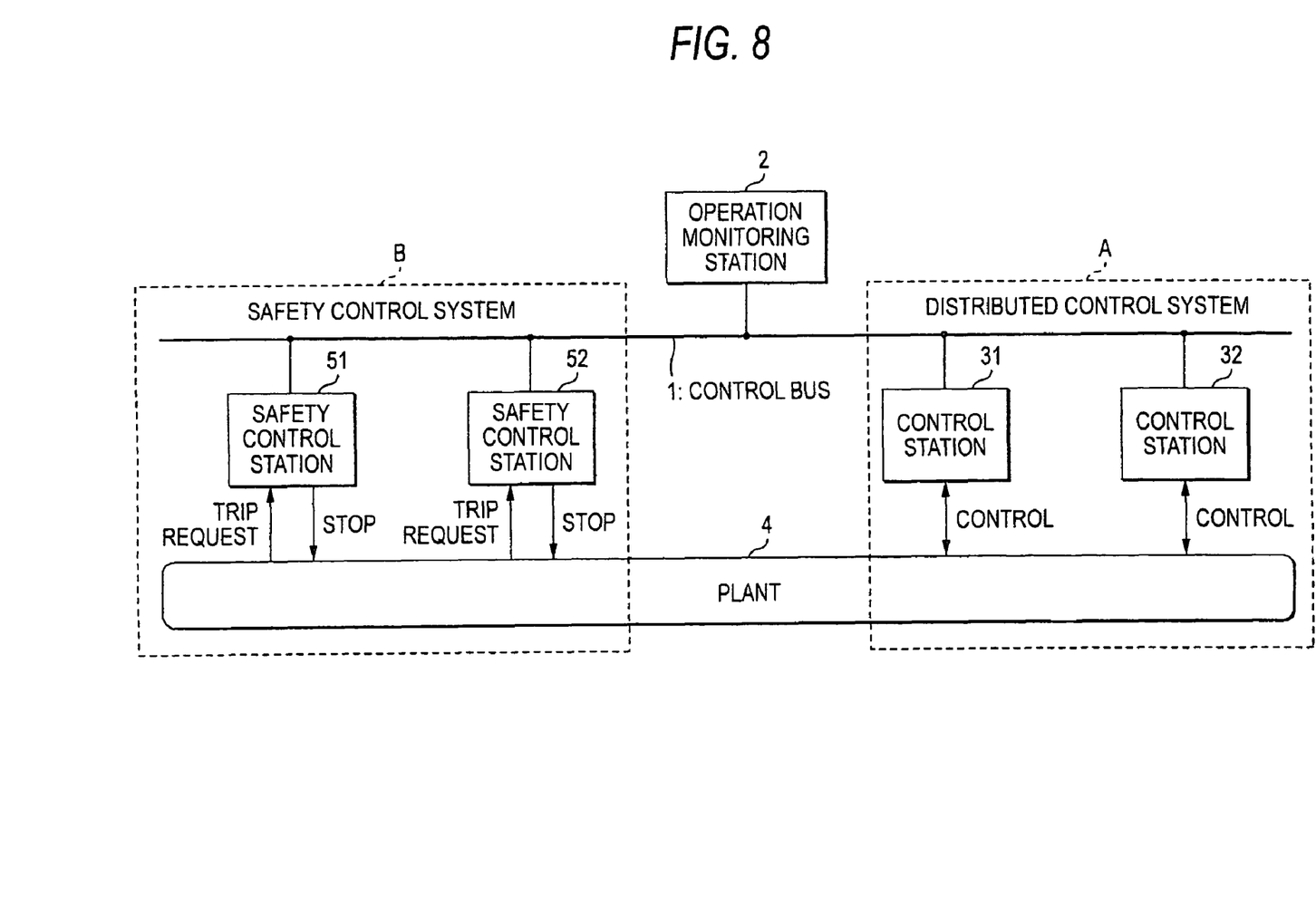
FIG. 8 is a functional block diagram showing an integrated environment of the distributed control system and the safety control system.

As to the safety control system integrated with the distributed control system, the technical disclosure is made in Patent Literature 1. FIG. 8 is a functional block diagram showing an integrated environment of the distributed control system and the safety control system, which is disclosed in Patent Literature 1.

Both the distributed control system indicated by a chain-line area A and the safety control system indicated by a chain-line area B are connected to a common control bus 1, and communicate with an operation monitoring station 2 that is also connected to this control bus 1 commonly to both systems.

In the distributed control system A, control stations 31, 32 communicate with the operation monitoring station 2 via the control bus 1, and also communicate with respective equipments (not shown) of a plant 4 and control them.

In the safety control system B, safety control stations 51, 52 communicate with the operation monitoring station 2 via the control bus 1, and also communicate with the equipments of the plant 4. When the safety control stations 51, 52 receive a trip request from the plant 4, they execute a stop operation of the plant 4.

The safety control system B can carry out the safety communication, which has gotten the approval at a SIL3 level, on the same control bus 1 as the distributed control system A. Thus, this safety control system B can build up the integrated system in which control communication of the distributed control system in the related art is mixed together.

In this case, the communication between the safety control stations makes it possible for each safety control station to inform quickly other safety control stations of an abnormal event that each safety control station sensed. Thus, the safety control station can deal quickly with the abnormal event in the plant, and therefore such communication is effective in preventing the hazards and narrowing the damage area.

The "safety communication" in the safety control system signifies the communication system that is equipped with an engineering to check the fact that safety-related data has been transferred certainly to the destination of communication through the existing unsafe communication system without fail.

In the safety communication, a safety layer for separating a safety function from the unsafe outside world is provided to the portion of the application layer of communication. Thus, all hazardous events that will happen in the communication (corruption, omission, delay, etc. of the data) are checked.

Figure 9:
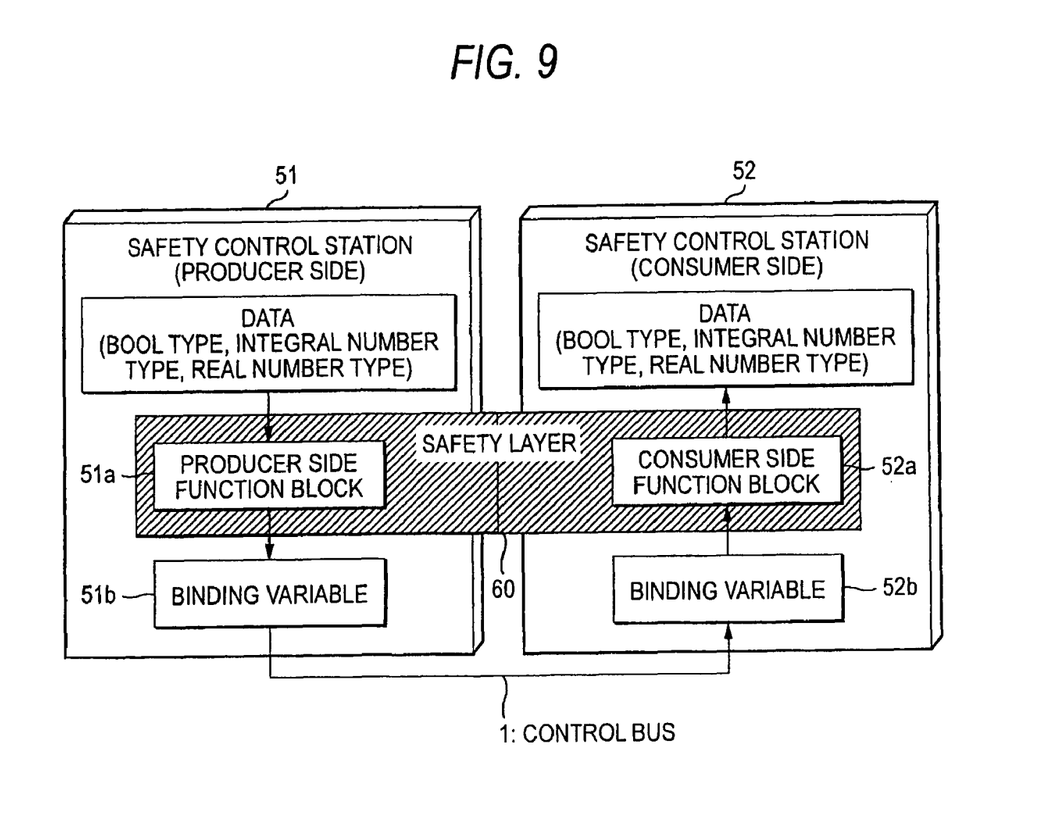
FIG. 9 is a functional block diagram explaining an engineering of the safety communication between the safety control stations.

FIG. 9 is a functional block diagram explaining an engineering of the safety communication between two safety control stations 51, 52. The communication data in the BOOL type, integral number type, or real number type data format are converted into the unique data format called the binding variable, and then flow through the control bus 1.

In this binding variable, a time stamp of the transmission time, a sequence number, and a CRC (Cyclic Redundancy Check) code for use in error check of all communication data are stored in addition to the data value. It is a producer side function block 51a that formulates these safety information, and a binding variable 51b after converted is sent out to the control bus 1.

In contrast, when received this variable, a consumer side function block 52a on the safety control station 52 side checks all abnormal events in communication by using a received binding variable 52b. When senses the abnormal event, the consumer side function block 52a outputs a fail-safe value designated previously as data, and outputs the abnormal event to the data status, and also issues a system alarm indicating occurrence of an error.

Both the producer side function block 51a and the consumer side function block 52a constitute a safety layer 60 that is used for the safety communication between two safety control stations 51, 52.

Figure 10:
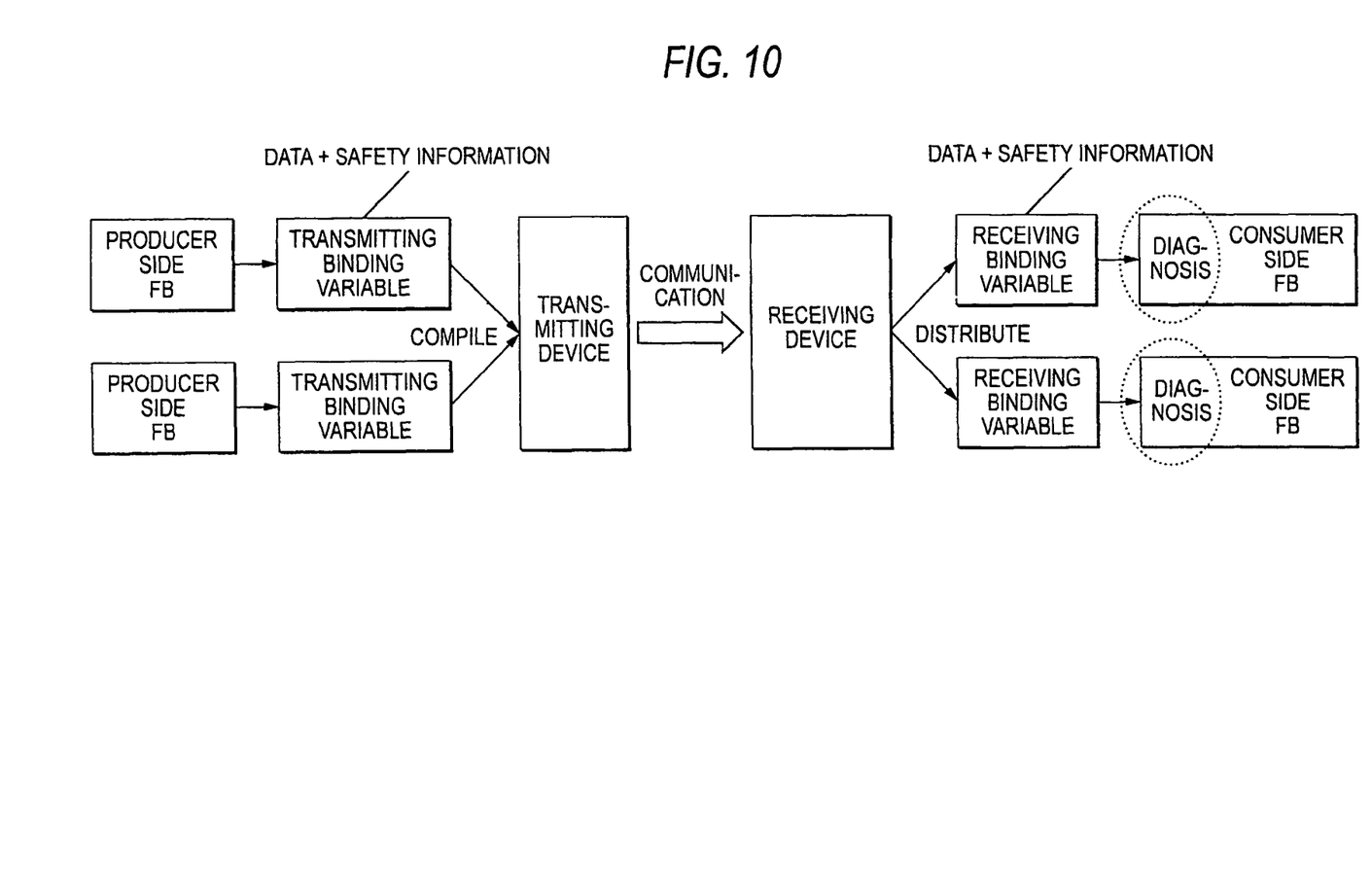
FIG. 10 is a conceptual illustration of the safety communication when plural pieces of transmitted/received data are present.

FIG. 10 is a conceptual illustration of the safety communication when plural pieces of transmitted/received data are present. A transmitting device of the safety control station on the producer side compiles once a plurality of transmitting binding variables, and then sends out the compiled variable to the destination station. A receiving device of the safety control station on the destination side distributes the received variable into corresponding receiving binding variables.

Figure 11:
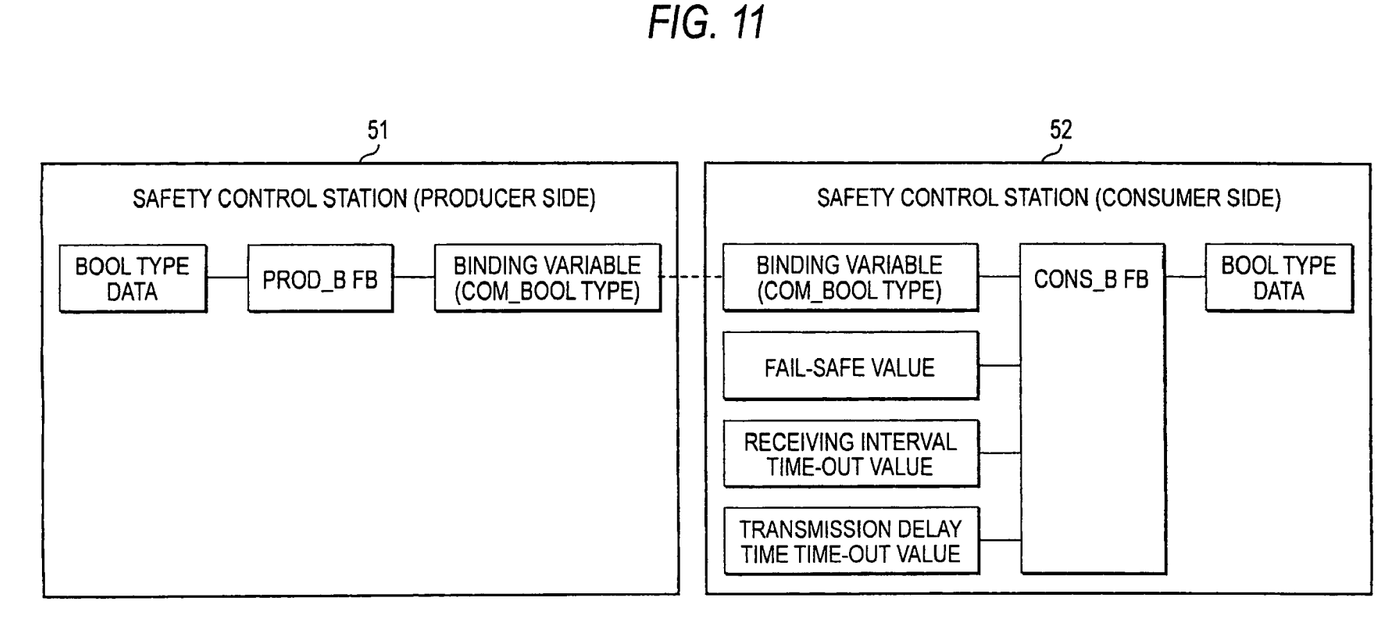
FIG. 11 is a functional block diagram of applications of the safety communication, which the user formulates.

FIG. 11 is a functional block diagram of applications of the safety communication, which are formulated by the user. A basic concept is the safety communication on a one-to-one basis through the intermediation of the binding variable. The user constructs the binding variable and input/output function blocks, and connects them to the application logic.

[Patent Literature 1] Japanese Patent Application Publication No. 2006-164143

In the safety communication between the safety control stations in the related art, the information for securing the safety communication is added to the data one by one, and the diagnosis of the received data is made by the safety layer provided to the consumer side function block. Therefore, the safety communication can be secured on the same control bus 1 through which communication data of the distributed control system also flows.

However, following problems existed in the safety communication between the safety control stations in the related art.

(1) The user has to formulate both applications of the binding variable and the function block. Therefore, the engineering is troublesome, and thus the engineering man-hours are increased.

(2) Since the data are transmitted/received individually, the communication and the CPU performance are expended. Therefore, it is impossible for many stations to share the data, and thus the communication performance is restricted.

(3) Since the data is diagnosed piece by piece, the alarms of the same number as the data are informed when the producer side safety control station is stopped. Therefore, a flood of alarms is caused.

SUMMARY

Exemplary embodiments of the present invention provide a safety control system that enables a large number of control stations to share information by a simple engineering without expenditure of the communication and the CPU performance.

Exemplary embodiments of the present invention is constructed as follows.

(1) A safety control system, includes a plurality of safety control stations connected to a control bus to communicate with other; and a link transmission communicating means having a function of transmitting own data to other safety control station at a fixed cycle via the control bus every safety control station and also receiving transmitted data from other safety control station.

(2) In the safety control system set forth in (1), the safety control station adds safety information to the data that is to be transmitted to the control bus at a fixed cycle.

(3) In the safety control system set forth in (1) or (2), the safety control station has a safety layer, which is used to generate and diagnose the safety information, in an interface to the control bus.

(4) In the safety control system set forth in (2) or (3), the safety information contains a CRC code.

(5) In the safety control system set forth in any one of (1) to (4), the safety control station communicates with a distributed control system via the control bus.

According to the present invention, advantages described as follows can be expected.

(1) The safety communication data can be transmitted by using the link transmission communicating means utilizing the control bus. Therefore, a large number of stations can share simply the information at a high speed. Also, the consumer side safety control station can receive freely the data at any timing. Therefore, the user can add the application simply.

(2) The safety communication data is transferred while using the predetermined data area of the link transmission. Therefore, only the function block used to access the data in this area and the database for storing the layout definition are needed. As a result, the engineering is made easy.

(3) The consumer side safety control station conduct a diagnosis on the assembly of the received data. Therefore, the load of the CPU becomes small. Also, even though the producer side control station is stopped, merely the alarm corresponding to the concerned station may be output. Therefore, a flood of alarms is not caused.

Other features and advantages may be apparent from the following detailed description, the accompanying drawings and the claims.

DETAILED DESCRIPTION

Figure 1:
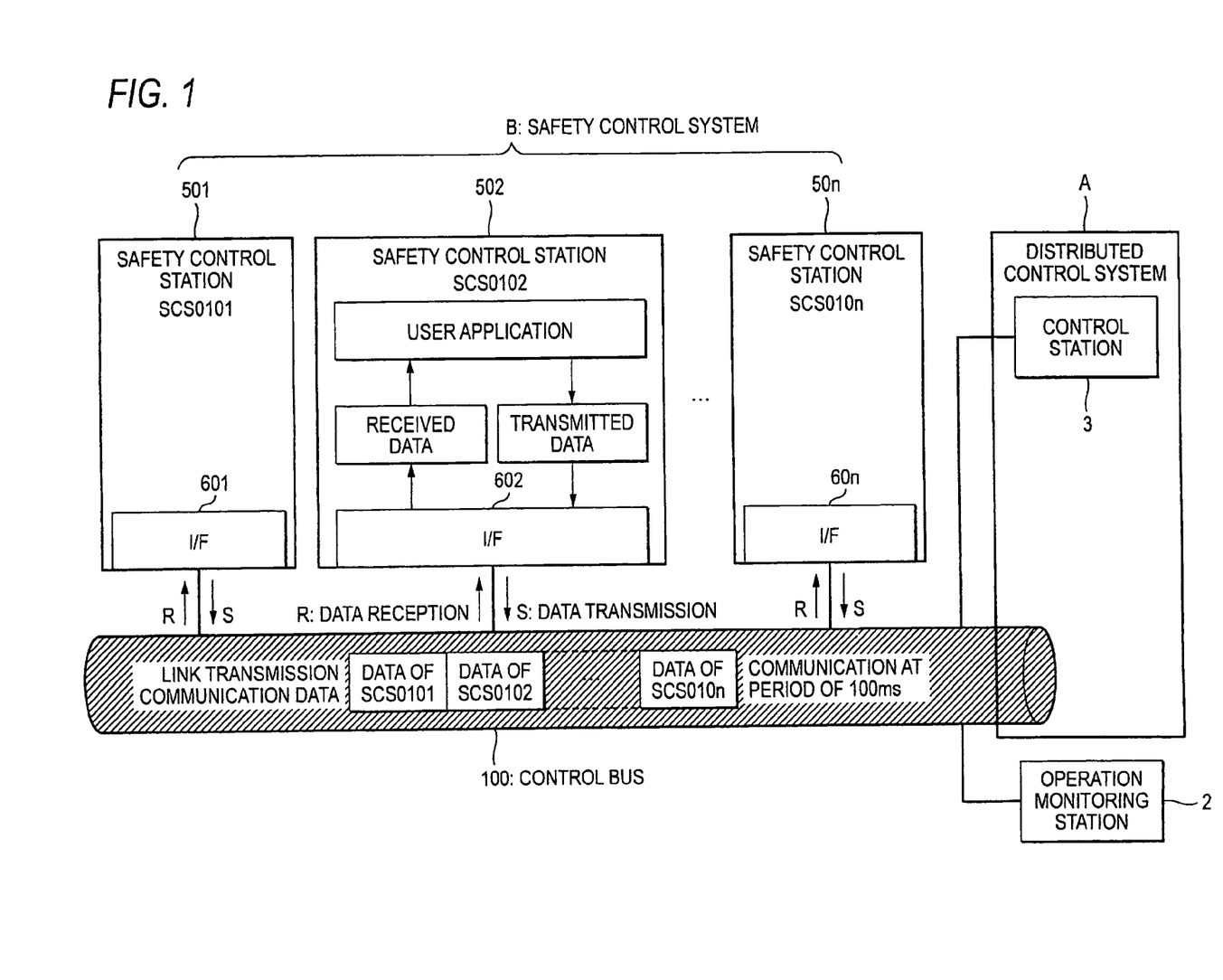
FIG. 1 is a functional block diagram showing an embodiment of a safety control system to which the present invention is applied.

The present invention will be explained in detail with reference to the drawings hereinafter. FIG. 1 is a functional block diagram showing an embodiment of a safety control system to which the present invention is applied. The same reference symbols are affixed to the same elements as those of the conventional system explained by reference to FIG. 8, and their explanation will be omitted herein.

The present invention provides the safety control system that enables the safety control stations to share the data in the safety communication more simply, by utilizing the link transmission communicating means that is installed to share the data among the safety control stations in the distributed control system.

In FIG. 1, safety control stations 501 (tag name SCS0101), 502 (tag name SCS0102), . . . , 50$n$ (tag name SCS010$n$), to which the present invention is applied, are connected to a control bus 100, into which the link transmission communicating means is installed, via interfaces 601, 602, . . . , 60$n$. The safety layer for use in the safety communication is formed in these interfaces.

The functional configuration of each safety control station will be illustrated hereunder, while using the safety control station 502 as a typical example. The safety control station 502 transmits its own transmitted data to be communicated with other safety control station from the user's application to the control bus 100 at a fixed cycle via the interface 602 (indicated with an arrow S).

At the same time, the safety control station 502 can receive the transmitted data of other safety station from the control bus 100 (indicated with an arrow R), and then the user's application can acquire the data via the interface 602.

Also, remaining safety control stations have the same function. The link transmission communicating means holds the transmitted data until the data of each safety control station is updated by the fixed-cycle transmission.

The link transmission data is the broadcast communication that informs respective safety control stations of the 32-byte data, for example, in a 100 mm sec period every safety control station. Each safety control station receives the data necessary for the process in the logic from other safety control stations, and transmits its own calculated data.

The producer side safety control station has no awareness of which safety control station is receiving its own transmitted data. This broadcast communication is the passive type communication in which the safety control station that needs the concerned data receives the data at its own starting timing.

Figure 2:
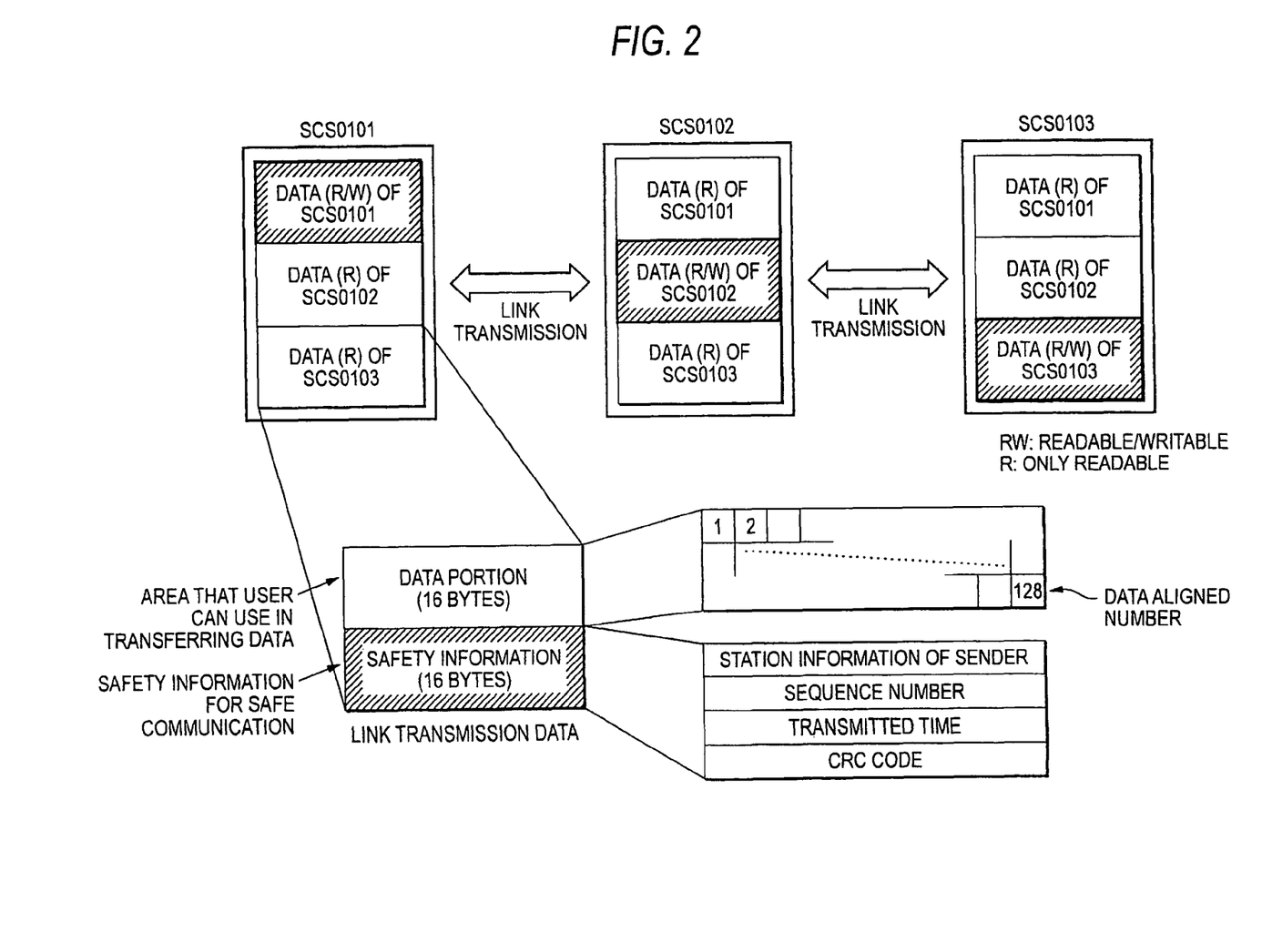
FIG. 2 is a data configurative view showing a data area of a safety communication and communication contents, which are provided to each safety control station.

FIG. 2 is a data configurative view showing the data area that each safety control station has for the safety communication and communication contents. Respective tag names are common to those in FIG. 1. Each safety control station has the data areas in the same number as the related control stations, and can write the data only in its own area as the transmission buffer.

Each data area has a size of 32 byte. In this embodiment, in order to handle the safety communication by utilizing the link transmission communicating means, a former half 16 byte is used as the data area and a latter half 16 byte is used as the safety information. The safety information adds a sequence number, a time stamp representing a transmitted time, and a CRC code to the 16-byte data.

Figure 3:
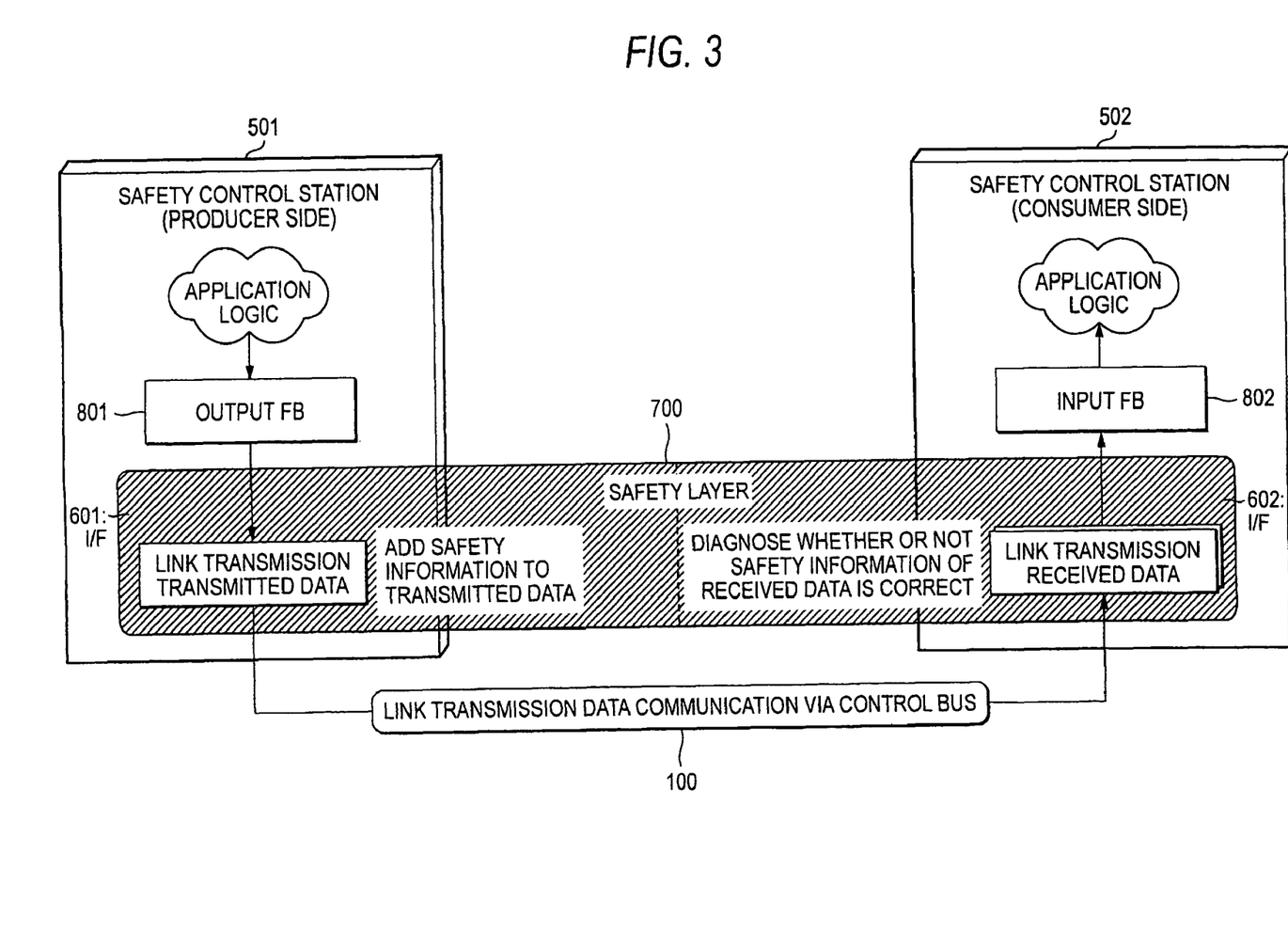
FIG. 3 is a functional block diagram explaining an engineering of the safety communication between safety control stations, to which the present invention is applied.

FIG. 3 is a functional block diagram explaining an engineering of the safety communication between safety control stations 501 and 502, to which the present invention is applied. A feature portion of the present invention is a safety layer 700 that is added newly to the interfaces 601 and 602 for the control bus 100.

In the producer side safety control station 501, the function of the safety layer 700 adds the safety information to the transmitted data of an output function block 801 that is used to transmit the result of the application logic as the safety communication data. Then, the function of the safety layer 700 transmits the resultant data as the link transmission data onto the control bus 100.

In the consumer side safety control station 502, the function of the safety layer 700 diagnoses the safety information that is received from the safety control station 501 via the control bus 100 and is added to the link transmission data. Then, the function of the safety layer 700 sends out the system alarm when the abnormal event is sensed. After the abnormality diagnosis, the link transmission data is transferred to the application logic via an input function block 802.

Figure 4:
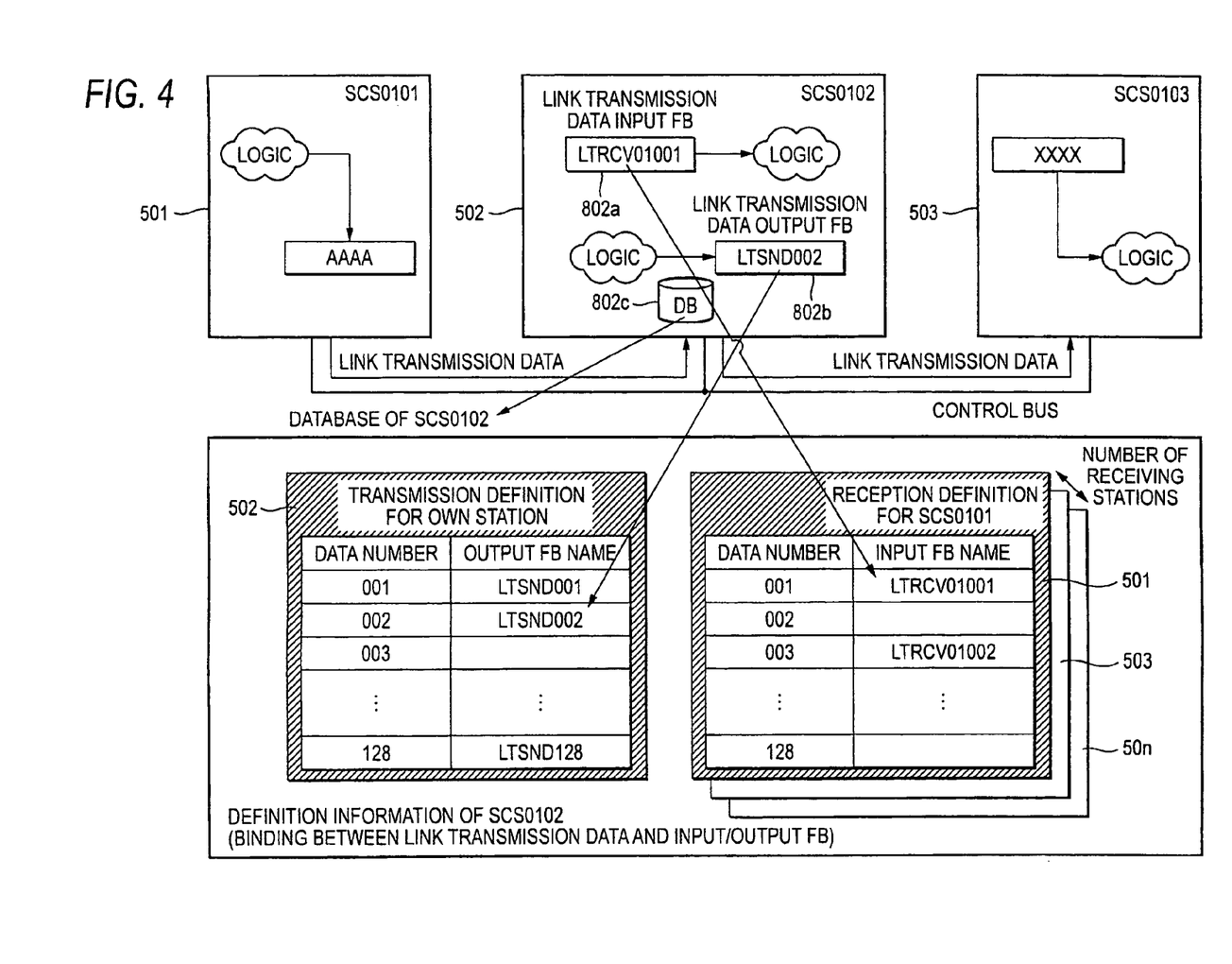
FIG. 4 is a functional block diagram explaining applications and a user-defined database to handle link transmission data.

FIG. 4 is a functional block diagram explaining applications and a user-defined database to handle the link transmission data. FIG. 4 shows the safety control station 502 (tag name SCS0102) as a typical example.

The safety control station has a simple configuration that only an input function block 802a and an output function block 802b are arranged on the application logic. A transmission definition and a reception definition both held in a database 802c indicate how the actual input/output function blocks and the transmission/reception data are coupled mutually respectively.

The user can lay out freely the transmission definition and the reception definition of this database and set them. The input/output function blocks 802a, 802b can know which data its own block should access, by referring to the definition of this database.

In this manner, the input/output function blocks and the link transmission communicating means make a promise of data positions in advance, and handle the transmitted/received data of the safety communication as an assembly of 16-byte data. As a result, the safety information can be assembled into one piece.

Figure 5A:
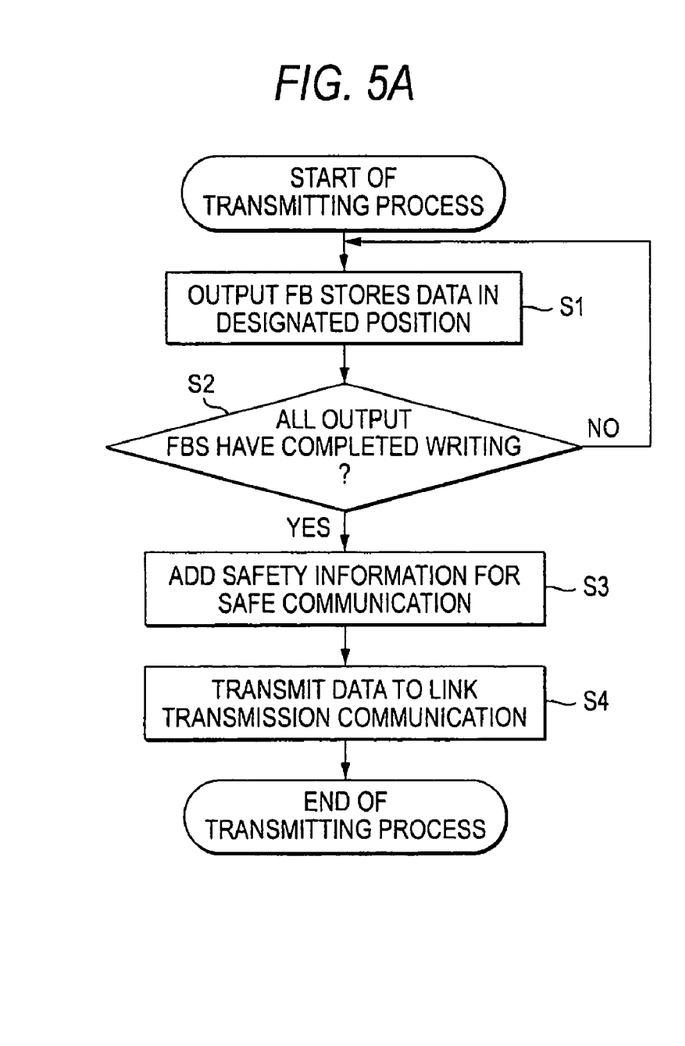
FIGS. 5A and 5B are flowcharts showing procedures of a transmitting process and a receiving process of the safety communication in the safety control system, to which the present invention is applied.
Figure 5B:
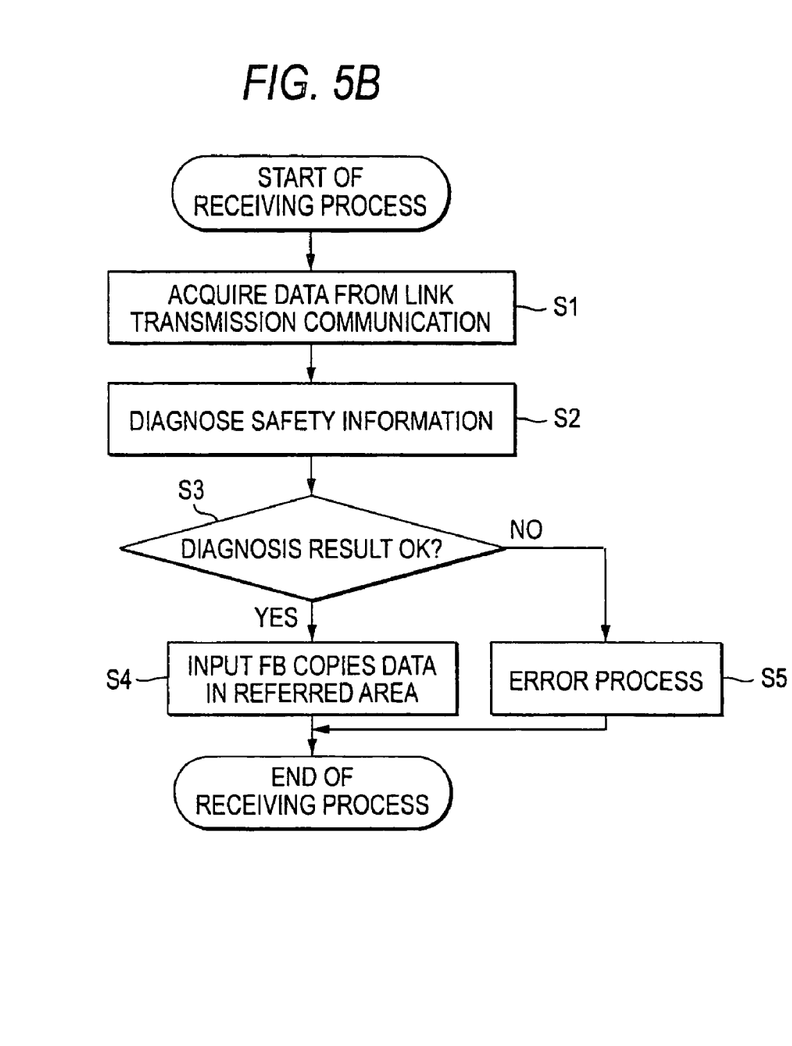

FIGS. 5A and 5B are flowcharts showing procedures of the transmitting process and the receiving process of the safety communication in the safety control system, to which the present invention is applied. FIG. 5A shows a flowchart of the transmitting process, and FIG. 5B shows a flowchart of the receiving process.

In the transmitting process in FIG. 5A, in step S1 and step S2, the output function block completes the writing of all data in the designated positions. Then, in step S3, the safety information for the safe communication is added. Then, in step S4, the data is transmitted to the link transmission communication.

In the receiving process in FIG. 5B, in step S1, the data is acquired from the link transmission communication. Then, in step S2, a diagnosis of the safety information is made. If the diagnosis result is OK in step S3, the data is copied as the assembly as it is in step S4, and the input function block picks up the necessary data. In contrast, if the diagnosis is not passed in step S3, the error process is executed in step S5.

Essentially, in the control station (FCS) of the distributed control system, the link transmission communicating means is used for the data communication between the FCSs as the global switch. Also, in the safety control system (SCS), even if it can be recognized by using this link transmission communicating means that the communication destination is either the FCS or the SCS, this link transmission communicating means can be used to share the data between the FCS and the SCS.

Figure 6:
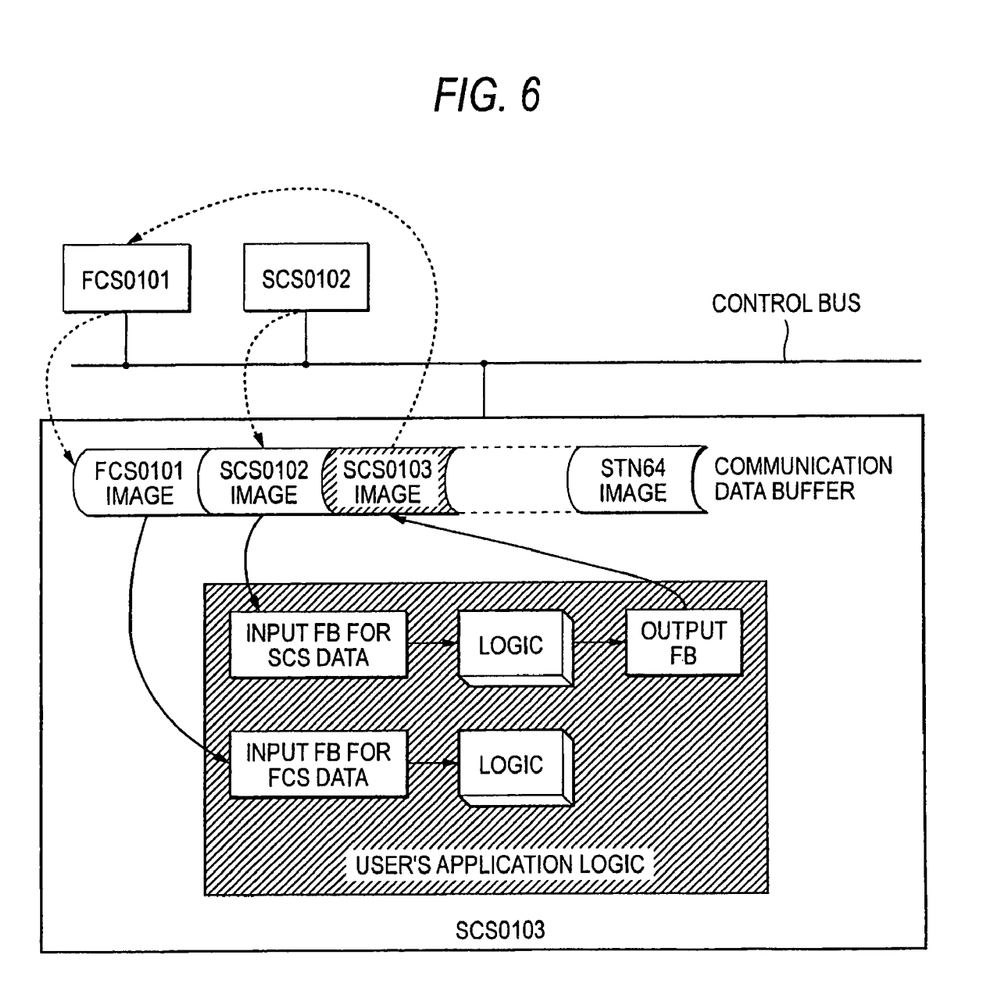
FIG. 6 is a functional block diagram explaining data sharing between the control stations of the distributed control system and the safety control station.

FIG. 6 is a functional block diagram explaining the data sharing between control stations of the distributed control system and the safety control station. FIG. 6 shows such a conceptual illustration that the safety control system FCS0103 receives the link transmission data of the control station FCS0101 of the distributed control system, and inputs the data into the logic via the input function block.

Figure 7A:
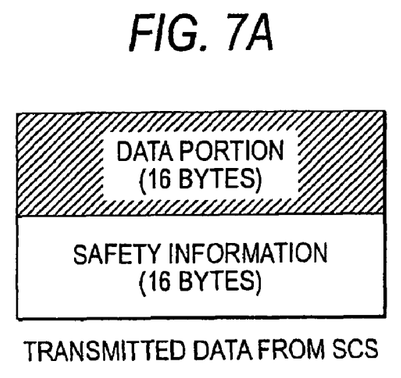
FIGS. 7A and 7B are data configurative views showing a difference between control station data and safety control station data, which the safety control station receives.
Figure 7B:
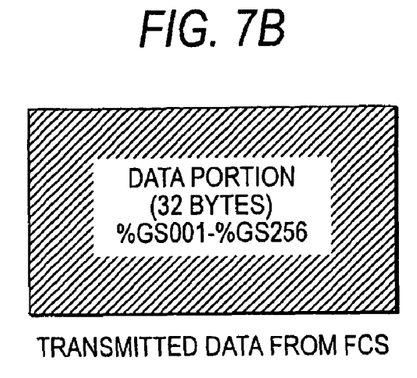

FIGS. 7A and 7B are data configurative views showing a difference between the control station data and the safety control station data, which the safety control station receives. FIG. 7A shows a data configuration of the safety control station (SCS), and FIG. 7B shows a data configuration of the control station (FCS).

The FCS data gives the data in the 32-byte fully, while the SCS data gives the data in the first half 16-byte only. The FCS can refer to the 16 byte of the transmitted data from the SCS as the global switch.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A safety control system, comprising:
   a plurality of safety control stations connected to a control bus to communicate with each other and with a distributed control system including a plurality of control stations connected to said control bus,
   wherein each of the plurality of safety control stations has an interface through which each of the plurality of safety control stations is connected to the control bus for transmitting own data of each of the plurality of safety control stations to all other safety control stations by broadcasting at a fixed cycle via the control bus and for receiving by each safety control station transmitted data from all other safety control stations, and
   wherein said interface implements a safety layer used to generate and diagnose safety information.

2. A safety control system according to claim 1, wherein each of the plurality of safety control stations is configured to add the safety information to the own data and to transmit the own data together with the safety information to the control bus at the fixed cycle.

3. A safety control system according to claim 1, wherein the safety information contains a CRC code.

4. A safety control system according to claim 1, wherein each of the plurality of control stations and each of the plurality of safety control stations is configured to broadcast the same amount of bytes within the fixed cycle, the amount of bytes transmitted by each of the plurality of control stations being assigned to data, and the amount of bytes transmitted by each of the plurality of safety control stations being shared by data and by the safety information.

5. A safety control system according to claim 4, wherein the amount of bytes transmitted within the fixed cycle is 32 bytes, and the safety information has 16 bytes.

6. A method for safety control in a system including a plurality of safety control stations connected to a control bus to communicate with each other and with a distributed control system including a plurality of control stations connected to the control bus, said method comprising the steps of:
    transmitting own data of each of the plurality of safety control stations to all other safety control stations by broadcasting at a fixed cycle through an interface by which each of the plurality of safety control stations is connected to the control bus;
    receiving by each of the plurality of safety control stations transmitted data from all other safety control; and
    generating and diagnosing safety information by a safety layer of said interface.

7. A safety control method according to claim 6, further comprising the steps of:
    adding the safety information to the own data; and
    transmitting the own data together with the safety information to the control bus at the fixed cycle.

8. A safety control method according to claim 6, wherein the safety information contains a CRC code.

9. A safety control method according to claim 6, wherein said transmitting by each of the plurality of control stations and each of the plurality of safety control stations broadcasts the same amount of bytes within the fixed cycle, the amount of bytes transmitted by each of the plurality of control stations being assigned to data, and the amount of bytes transmitted by each of the plurality of safety control stations being shared by data and by the safety information.

10. A safety control method according to claim 9, wherein the amount of bytes transmitted within the fixed cycle is 32 bytes, and the safety information has 16 bytes.

\* \* \* \* \*